United States Patent
Kim et al.

(10) Patent No.: US 11,500,693 B2
(45) Date of Patent: Nov. 15, 2022

(54) DISTRIBUTED SYSTEM FOR DISTRIBUTED LOCK MANAGEMENT AND METHOD FOR OPERATING THE SAME

(71) Applicant: ELECTRONICS AND TELECOMMUNICATIONS RESEARCH INSTITUTE, Daejeon (KR)

(72) Inventors: Kang-Ho Kim, Daejeon (KR); Kwang-Won Koh, Daejeon (KR); Hong-Yeon Kim, Daejeon (KR); Baik-Song An, Seoul (KR); Sang-Min Lee, Daejeon (KR)

(73) Assignee: Electronics and telecommunications research institute, Daejeon (KR)

( * ) Notice: Subject to any disclaimer, the term of this patent is extended or adjusted under 35 U.S.C. 154(b) by 262 days.

(21) Appl. No.: 16/836,246

(22) Filed: Mar. 31, 2020

(65) Prior Publication Data

US 2020/0319939 A1    Oct. 8, 2020

(30) Foreign Application Priority Data

Apr. 4, 2019    (KR) .................. 10-2019-0039459

(51) Int. Cl.
*G06F 9/52*      (2006.01)
*G06F 9/50*      (2006.01)
*G06F 9/30*      (2018.01)
*G06F 9/38*      (2018.01)

(52) U.S. Cl.
CPC .............. *G06F 9/52* (2013.01); *G06F 9/3012* (2013.01); *G06F 9/3891* (2013.01); *G06F 9/5005* (2013.01)

(58) Field of Classification Search
CPC .................................. G06F 3/065; G06F 3/067
USPC ........................................................ 711/150
See application file for complete search history.

(56) References Cited

U.S. PATENT DOCUMENTS

| | | | | |
|---|---|---|---|---|
| 4,604,694 A | * | 8/1986 | Hough | G06F 9/52 710/200 |
| 6,343,339 B1 | * | 1/2002 | Daynes | G06F 9/52 710/200 |
| 7,370,054 B1 | * | 5/2008 | Martin | G06F 16/9014 707/999.1 |

(Continued)

FOREIGN PATENT DOCUMENTS

| | | |
|---|---|---|
| JP | 3551104 B2 | 5/2004 |
| JP | 2006023801 A | 1/2006 |

(Continued)

OTHER PUBLICATIONS

Yeounoh Chung et al., "Using RDMA for Lock Management", Jul. 20, 2015, pp. 1-6, https://arxiv.org/abs/1507.03274.

*Primary Examiner* — Titus Wong (57) ABSTRACT

Disclosed herein are a distributed system and a method for operating the distributed system. The method for operating a distributed system including a server and multiple clients includes acquiring, by a first client of the multiple clients, a lock on a shared resource using a first table of the server and a second table of the client, and releasing, by the first client, a lock on the shared resource using the first table and the second table, wherein the first table is a lock (DSLock) table for storing information about a distributed shared resource, and the second table is a data structure (DSLock_node) table for a lock request.

13 Claims, 9 Drawing Sheets

(56) References Cited

U.S. PATENT DOCUMENTS

| | | | |
|---|---|---|---|
| 7,418,500 B1* | 8/2008 | Bolinger | H04L 67/1097 707/999.009 |
| 7,487,279 B2 | 2/2009 | Su | |
| 8,868,604 B2* | 10/2014 | Li | G06F 21/6218 718/104 |
| 10,609,150 B2 | 3/2020 | Lan et al. | |
| 2004/0221079 A1* | 11/2004 | Goldick | G06F 9/52 710/200 |
| 2005/0097183 A1* | 5/2005 | Westrelin | G06F 12/1081 709/212 |
| 2005/0240585 A1* | 10/2005 | Makhervaks | G06F 21/6218 |
| 2006/0090168 A1* | 4/2006 | Ogasawara | G06F 9/30087 719/320 |
| 2006/0136637 A1* | 6/2006 | Goldick | G06F 9/526 710/200 |
| 2007/0233970 A1* | 10/2007 | Saha | G06F 9/526 711/152 |
| 2008/0141177 A1 | 6/2008 | Koo et al. | |
| 2008/0244087 A1* | 10/2008 | Pope | H04L 45/56 709/238 |
| 2008/0276256 A1* | 11/2008 | Ogasawara | G06F 9/52 719/320 |
| 2009/0106248 A1* | 4/2009 | Vaghani | G06F 16/1767 |
| 2010/0100889 A1* | 4/2010 | Labrie | G06F 9/526 718/106 |
| 2010/0131651 A1 | 5/2010 | Jeong et al. | |
| 2013/0054726 A1* | 2/2013 | Bugge | G06F 9/52 709/212 |
| 2014/0379991 A1* | 12/2014 | Lomet | G06F 12/0891 711/135 |
| 2017/0075856 A1* | 3/2017 | Suzue | G06F 15/17331 |
| 2017/0103039 A1 | 4/2017 | Shamis et al. | |

FOREIGN PATENT DOCUMENTS

| | | |
|---|---|---|
| JP | 2018110031 A | 7/2018 |
| KR | 1020010053691 A | 7/2001 |
| KR | 1020090106392 A | 10/2009 |
| KR | 1020150089747 A | 8/2015 |

\* cited by examiner

```
struct DSLock {              struct DSLock_node {              struct Next {
    struct Next next;            unsigned long locked:64;          unsigned long node_id:16;
}                                struct Next next                  unsigned long lock_vaddr:48;
                             }                                 }
```

DISTRIBUTED SYSTEM FOR DISTRIBUTED LOCK MANAGEMENT AND METHOD FOR OPERATING THE SAME

CROSS REFERENCE TO RELATED APPLICATION

This application claims the benefit of Korean Patent Application No. 10-2019-0039459, filed Apr. 4, 2019, which is hereby incorporated by reference in its entirety into this application.

BACKGROUND OF THE INVENTION

1. Technical Field

The present invention relates generally to a concurrency control technique for maintaining the consistency of resources shared by multiple nodes connected over a network.

2. Description of the Related Art

Generally, an operating system makes and serializes access to resources using a lock manager. A distributed lock manager (DLM) is executed on all computers present in the same duplicate cluster of a lock database for the entire cluster. A DLM provides software applications distributed among clusters of a plurality of systems by exploiting a means for synchronizing access to shared resources. With the development of the latest network technology, the speed of access to shared resources, especially remote shared memory, is not greatly different from the speed of access to local memory. In this situation, it is very inefficient to use a DLM based on a technique for synchronizing shared resources. Therefore, what is required is a new distributed lock technique that takes into consideration the short time taken to access shared resources.

PRIOR ART DOCUMENTS

Patent Documents (Patent Document 1) U.S. Patent Application Publication No. US 2017-0075856, Date of Publication: Mar. 16, 2017, Title: DISTRIBUTED LOCK-FREE RDMA-BASED MEMORY ALLOCATION AND DE-ALLOCATION (Patent Document 2) U.S. Patent Application Publication No. US 2017-0103039, Date of Publication: Apr. 13, 2017, Title: DISTRIBUTED SELF-DIRECTED LOCK-FREE RDMA-BASED B-TREE KEY-VALUE MANAGER

Non-Patent Documents (Non-patent Document 1) Y. Chung et al, "Using RDMA for Lock Management", https://arxiv.org/abs/1507.03274, Date of Publication: Jul. 20, 2015

SUMMARY OF THE INVENTION

Accordingly, the present invention has been made keeping in mind the above problems occurring in the prior art, and an object of the present invention is to eliminate unnecessary delay of a process attributable to a lock-related operation when the time taken to access shared resources is very short in a distributed system using a fast RDMA network, thus improving performance.

In accordance with an aspect of the present invention to accomplish the above object, there is provided a method for operating a distributed system including a server and multiple clients, the method including acquiring, by a first client of the multiple clients, a lock on a shared resource using a first table of the server and a second table of the client; and releasing, by the first client, a lock on the shared resource using the first table and the second table.

In an embodiment, the first table may be a lock (DSLock) table for storing information about a distributed shared resource, and the second table may be a data structure (DSLock_node) table for a lock request.

In an embodiment, each of the first and second tables may include a client identifier (node_id) and a virtual address (lock_vaddr) of an entry in the lock table of the client.

In an embodiment, the second table may include information (TRUE or FALSE) indicating a lock state for the shared resource.

In an embodiment, a number of entries in the first table may equal a number of shared resources to be managed.

In an embodiment, the server may allocate a memory space for the first table and register the allocated memory space as a remote direct memory access (RDMA) region.

In an embodiment, when the allocated memory space is registered as the RDMA region, the server may distribute a memory region key corresponding to the allocated memory space to the multiple clients.

In an embodiment, acquiring the lock may include setting a node corresponding to the first client to an entry of the second table for which the lock is to be represented; reading an entry corresponding to the identification information (id) of the shared resource from the second table using an address of the server and the identification information (id); and setting the entry of the second table to a value indicating a lock state using a remote compare-and-swap (CAS) operation.

In an embodiment, releasing the lock may include setting an entry of the second table for which the lock is to be released to a node corresponding to the first client; and setting the entry of the second table to a value indicating a lock release using a remote compare-and-swap (CAS) operation.

In accordance with another aspect of the present invention to accomplish the above object, there is provided a distributed system, including a server for managing a first table having a lock (DSLock) table pertaining to a shared resource; and multiple clients for managing a second table having a data structure (DSLock_node) table for a lock request, wherein each of the multiple clients acquires or releases a lock on the shared resource using the first and second tables, and wherein a process of a client that requests the lock is busy waiting.

In an embodiment, a first client of the multiple clients may be capable of accessing the first table of the server and second tables of remaining clients using remote direct memory access (RDMA).

In an embodiment, when a first client of the multiple clients acquires a lock in a state in which lock contention is not present, an entry value of the first table of the server may be a NULL value, and entry values of second tables of remaining clients other than the first client may be NULL values.

In an embodiment, when a second client of the multiple clients attempts to acquire a lock in a state in which a first client of the multiple clients has acquired the lock, an entry value of a second table of the second client may be registered in the first table of the server using a remote compare-and-swap (CAS) operation.

In an embodiment, when lock contention is not present between the multiple clients, a corresponding entry value of the first table of the server may become a NULL value after the lock is released.

BRIEF DESCRIPTION OF THE DRAWINGS

The accompanying drawings are provided to aid in understanding of the present embodiments, and the embodiments are provided together with the detailed descriptions thereof. However, the technical features of the present embodiments are not limited to what is specifically shown in the drawings, and the features disclosed in respective drawings may be combined to configure new embodiments.

DESCRIPTION OF THE PREFERRED EMBODIMENTS

Embodiments of the present invention are described with reference to the accompanying drawings in order to describe the present invention in detail so that those having ordinary knowledge in the technical field to which the present invention pertains can easily practice the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It will be understood that, although the terms "first" and "second" may be used herein to describe various components, these components are not limited by these terms.

These terms are only used to distinguish one component from another component. For instance, a "first" component discussed below could be termed a "second" component without departing from the teachings of the present invention. Similarly, a "second" component could also be termed a "first" component. It will be understood that when a component is referred to as being "coupled" or "connected" to another component, it can be directly coupled or connected to the other component, or intervening components may be present therebetween. In contrast, it should be understood that when a component is referred to as being "directly coupled" or "directly connected" to another component, there are no intervening components present. The terminology used herein is for the purpose of describing particular embodiments only and is not intended to be limiting. In the present invention, singular forms are intended to include the plural forms as well, unless the context clearly indicates otherwise.

It should be further understood that the terms "comprise", "include", and "have", when used in this specification, specify the presence of stated features, integers, steps, operations, elements, components, and/or combinations thereof, but do not preclude the presence or addition of one or more other features, integers, steps, operations, elements, components, and/or combinations thereof. Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Generally, in order to maintain the consistency of resources shared by multiple computing nodes connected over a network, a distributed lock manager (DLM) is used. Such a DLM provides a lock mechanism that maintains a shared resource list and controls the allocation and change of resources. The DLM does not control access to distributed resources themselves. All processes that access distributed shared resources protected by the DLM must explicitly acquire a lock on the corresponding resources. Each process accesses distributed shared resources after obtaining permission from the DLM.

Figure 1:
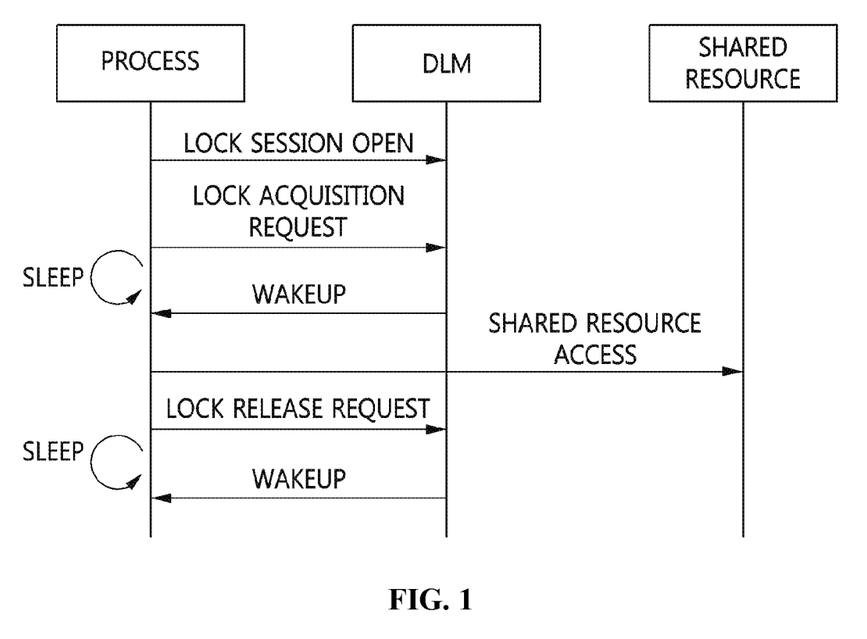
FIG. 1 is a diagram illustrating a lock acquisition/release procedure in a process using a typical DLM.

FIG. 1 is a diagram illustrating a lock acquisition/release procedure in a process using a typical DLM. Referring to FIG. 1, when the DLM is used, the process acquires and releases a lock on a distributed shared resource.

At a first step, the process of a distributed node opens a lock session corresponding to a shared resource desired to be accessed, and then prepares to execute a lock operation (lock session open). After the lock session has been created, the process transmits a lock acquisition request to the DLM. Thereafter, the process sleeps until it wakes up by receiving a response from the DLM (lock acquisition request→sleep→wakeup). When a success response to the lock acquisition request is received, the process accesses a shared resource corresponding to a lock (access to shared resource). After access to the shared resource has been terminated, the process transmits a lock release request to the DLM (lock release request). As in the case of the lock acquisition request step, the process sleeps until a wakeup response is received from the DLM (sleep→wakeup).

When the DLM is used, a communication delay time attributable to a multi-stage communication protocol between the process and the DLM is lengthened and bottlenecks on a DLM server attributable to the concentration of lock requests occur, thus deteriorating the performance of the distributed system. When a shared disk block is accessed, the time taken to access the block is very long, and thus a problem is not large even when the lock acquisition time is long. In contrast, when remote shared memory is used for remote direct memory access (RDMA), a severe problem may occur. Also, the process sleeps after transmitting a lock request to the DLM. Then, the time taken to wake up after the lock request is granted is much longer than the time taken to access remote memory using RDMA.

The distributed system according to the embodiment of the present invention may eliminate a lock session open/acquire/release delay time and a process sleep/wakeup delay time using a distributed spinlock. When utilizing a distributed spinlock, the process is busy waiting (i.e., in a busy-wait state) until a lock is acquired without sleeping/waking up. When the process that has acquired the lock releases the lock, the distributed system according to the present invention may directly deliver authority for the lock to the process that requested the lock, thus mitigating bottlenecks on the DLM server.

The distributed system according to the embodiment of the present invention may apply an RDMA atomic operation to the distributed system based on an MCS algorithm used in a single system.

Figure 2:
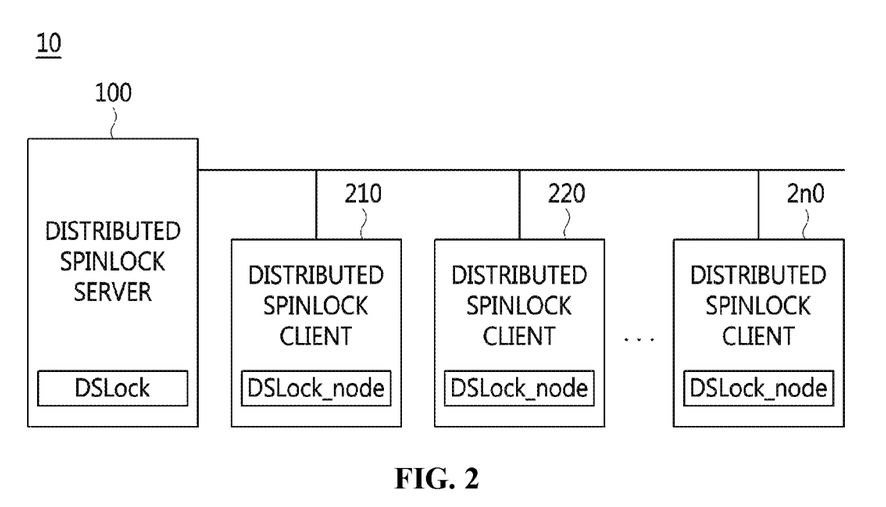
FIG. 2 is a block diagram exemplarily illustrating a distributed system according to an embodiment of the present invention.

FIG. 2 is a block diagram exemplarily illustrating a distributed system 10 according to an embodiment of the present invention. Referring to FIG. 2, the distributed system 10 may include a distributed spinlock server 100 and multiple clients 210, 220, . . . , 2n0, where n is an integer of 2 or more.

The distributed spinlock server 100 may be configured to manage a lock (DSLock) table (or a first table) indicating individual distributed shared resources.

Each of the distributed spinlock clients 210, 220, . . . , 2n0 may be configured to manage a data structure (DSLock_node) table (or a second table) for a lock request.

Figure 3:
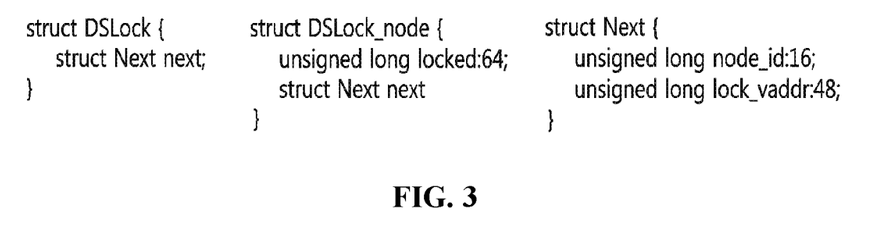
FIG. 3 is a diagram exemplarily illustrating a lock and data structure according to an embodiment of the present invention.

FIG. 3 is a diagram exemplarily illustrating a lock and data structure according to an embodiment of the present invention. Referring to FIG. 3, node_id denotes a client identifier, and lock_vaddr denotes the virtual address of each entry in the lock table of a client.

In an embodiment, in 'Next' data structure, node_id may be indicated by 16 bits, and lock_vaddr may be indicated by 48 bits. The reason for this is that an RDMA network supports only a 64-bit remote atomic operation. "locked" indicates the state of a lock, wherein, when "locked" is TRUE, it means the situation in which an additional client acquires a lock, and the relevant client must wait to acquire a lock, and when "locked" is FALSE, it means the situation in which the relevant client acquires a lock.

In an embodiment, the distributed system 10 may initialize the DSLock table of the distributed spinlock server 100 and the DSLock_node table of each distributed spinlock client.

In an embodiment, the number of entries in the DSLock table of the distributed spinlock server 100 equals the number of shared resources to be managed.

In an embodiment, the distributed spinlock server 100 may allocate memory space for the DSLock table, and may register the allocated memory space as a remote direct memory access (RDMA) region.

In an embodiment, the distributed spinlock server 100 may distribute a memory region key and a memory address to all of the distributed spinlock clients 210, 220, . . . , 2n0 during the registration of the RDMA region. Thereafter, the distributed spinlock server 100 may initialize the values of node_id and lock_vaddr in respective entries of the DSLock table to '0'.

In an embodiment, each of the distributed spinlock clients 210, 220, . . . , 2n0 allocates a memory region for the DSLock_node table, and may register the allocated memory region as an RDMA region. Also, each of the distributed spinlock clients 210, 220, . . . , 2n0 may distribute a memory region key to all of the distributed spinlock clients 210, 220, . . . , 2n0 during the registration of the RDMA region. Thereafter, each of the distributed spinlock clients 210, 220, . . . , 2n0 may initialize "locked" in the entry of the DSLock_node table to FALSE and initialize node_id and lock_vaddr in the entries to '0'.

In an embodiment, each of the distributed spinlock clients 210, 220, . . . , 2n0 may generate a single queue pair that supports a reliable datagram for accessing the table of an additional client or the server using an RDMA operation.

Figure 4:
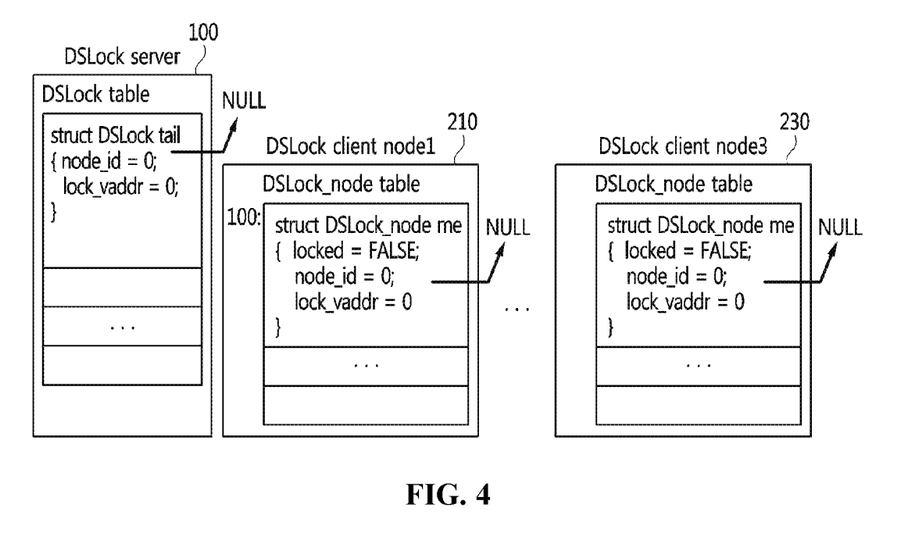
FIG. 4 is a diagram exemplarily illustrating the initial state of a distributed system according to an embodiment of the present invention.

FIG. 4 is a diagram exemplarily illustrating the initial state of a distributed system according to an embodiment of the present invention. Referring to FIG. 4, the values of node_id and lock_vaddr in respective entries of the DSLock table of the distributed spinlock server 100 may be initialized to '0', and, each of the distributed spinlock clients 210, 220, . . . , 2n0 may initialize "locked" in the entry of the DSLock_node table thereof to FALSE, and initialize the values of node_id and lock_vaddr in respective entries to '0'.

Figure 5:
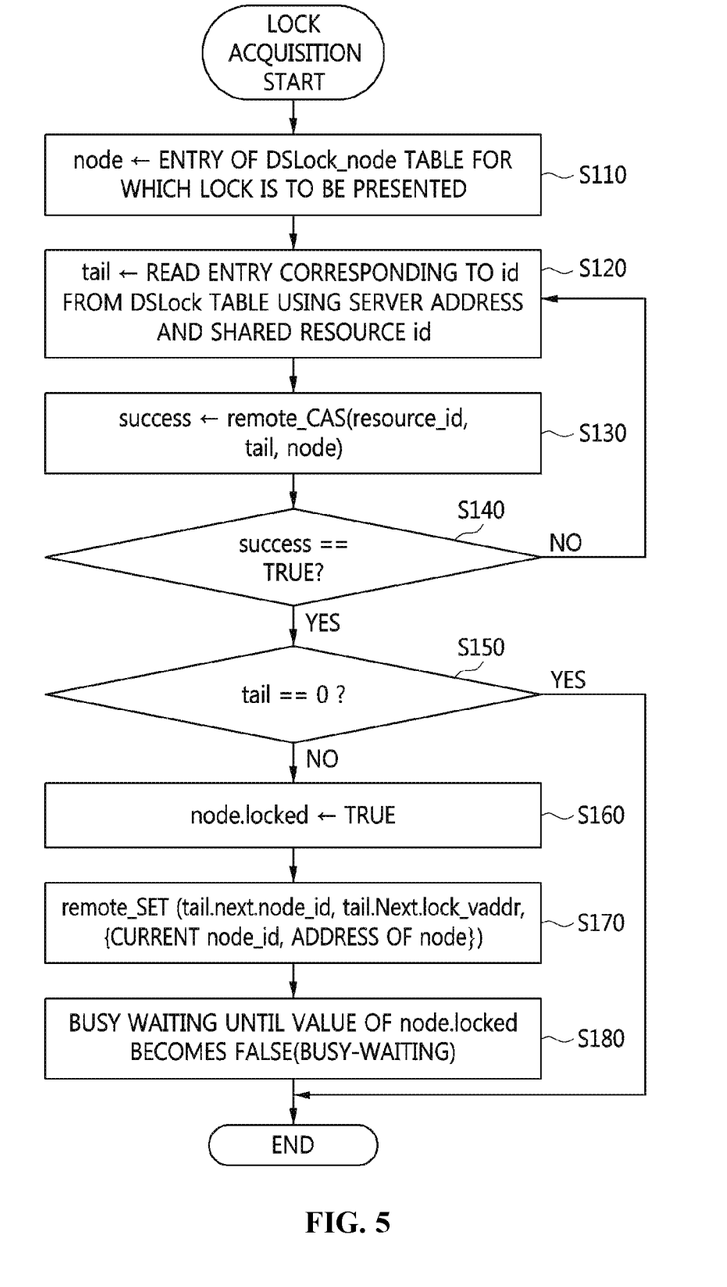
FIG. 5 is a flowchart exemplarily illustrating a procedure in which a distributed spinlock client acquires a lock on a specific shared resource according to an embodiment of the present invention.

FIG. 5 is a flowchart exemplarily illustrating a procedure in which a distributed spinlock client acquires a lock on a specific shared resource according to an embodiment of the present invention. Referring to FIGS. 2 to 5, the procedure in which the distributed spinlock client (e.g., 210 of FIG. 2) acquires a lock on a shared resource may be performed as follows.

As the entry of the DSLock_node table for which a lock is to be represented, 'node' may be set at step S110. 'tail' may be set by reading the entry corresponding to 'id' from the DSLock table using a server address and a shared resource id at step S120. As remote_Compare-and-Swap (CAS) (resource_id, tail, node), 'success' may be set at step S130. Whether 'success' is TRUE may be determined at step S140. If it is determined that 'success' is not TRUE, the process may return to step S120. In contrast, if it is determined that 'success' is TRUE, whether the value of 'tail' is 0 may be determined at step S150. If it is determined that the value of 'tail' is not 0, the lock acquisition operation may be terminated. In contrast, if it is determined that the value of 'tail' is not 0, 'node.locked' may be set to TRUE at step S160. Next, the entry 'remote_SET (tail.next.node_id, tail.next.lock_vaddr, {current node_id, address of node})' may be set at step S170. Until the value of 'node.locked' becomes FALSE, the distributed spinlock client may be busy waiting (i.e., in a busy-wait state) at step S180.

Figure 6:
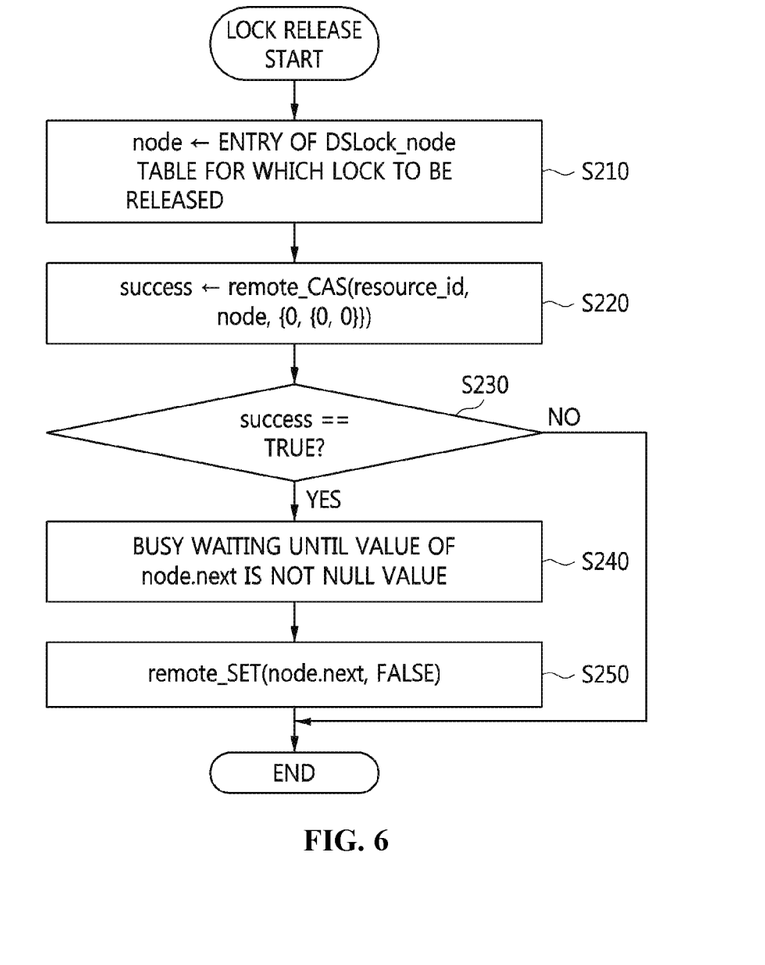
FIG. 6 is a flowchart exemplarily illustrating a procedure in which a distributed spinlock client releases a lock on a specific shared resource according to an embodiment of the present invention.

FIG. 6 is a flowchart exemplarily illustrating a procedure in which a distributed spinlock client releases a lock on a specific shared resource according to an embodiment of the present invention. Referring to FIGS. 2 to 6, the procedure in which the distributed spinlock client releases a lock on a specific shared resource may be performed as follows.

As the entry of a DSLock_node table for which a lock to be released is to be represented, 'node' may be set at step S210. As a remote_CAS (resource_id, node, {0, {0, 0}}), 'success' may be set at step S220. Whether 'success' is TRUE may be determined at step S230. If it is determined that 'success' is TRUE, the lock release procedure may be terminated. In contrast, if it is determined that 'success' is not TRUE, the distributed spinlock client may be busy waiting until the value of 'node.next' is not a NULL value at step S240. Next, remote_SET (node.next, FALSE) may be set at step S250.

Meanwhile, the procedures in which the distributed spinlock client accesses the DSLock table stored in the distributed spinlock server and a DSLock_node table stored in an additional client using RDMA will be described below. These procedures may be utilized in a lock acquisition and lock release procedure.

Figure 7:
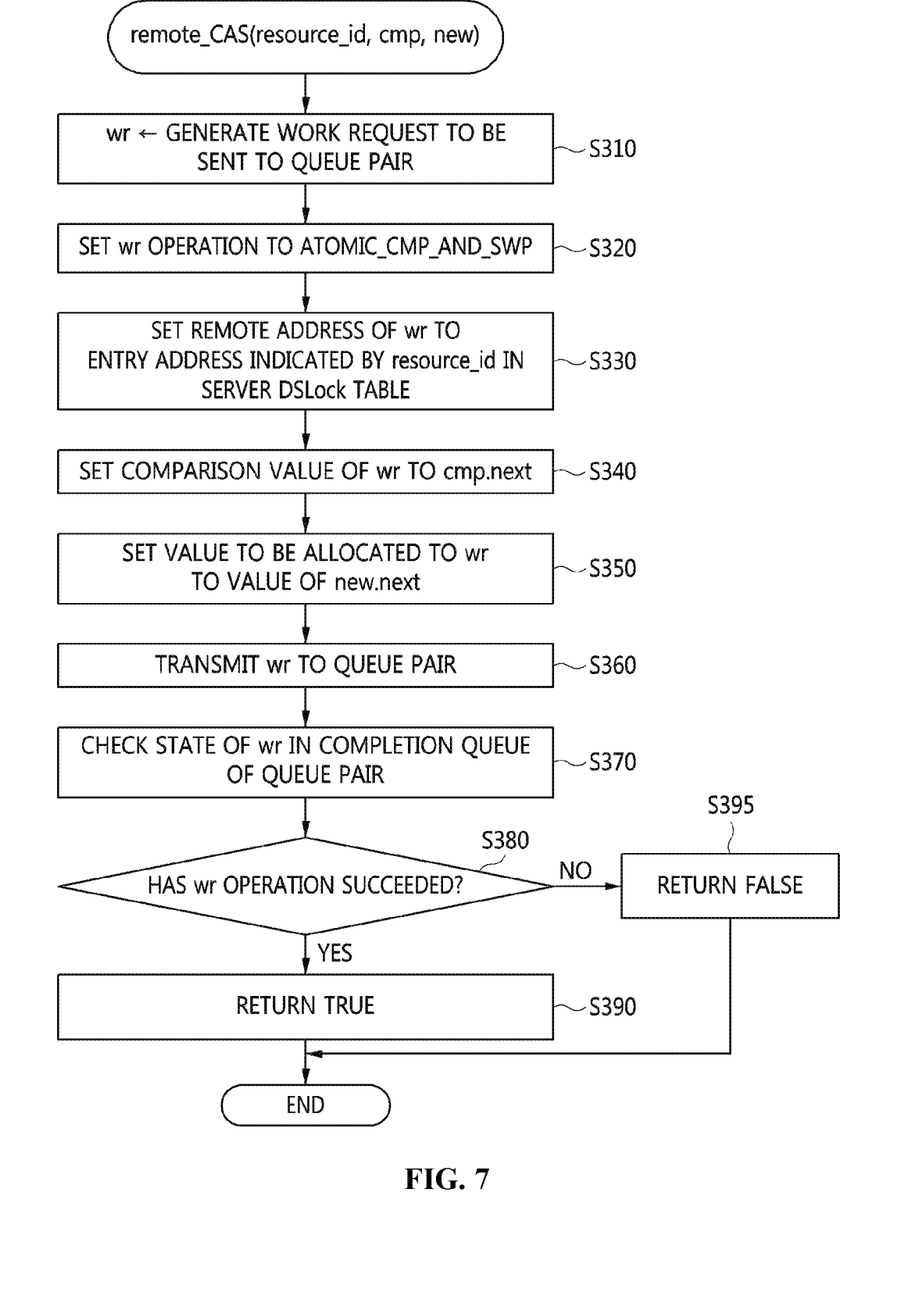
FIG. 7 is a flowchart exemplarily illustrating a procedure in which a distributed spinlock client accesses a DSLock table, stored in a distributed spinlock server, using RDMA according to an embodiment of the present invention.

FIG. 7 is a diagram exemplarily illustrating a procedure in which a distributed spinlock client 210 accesses a DSLock table stored in a distributed spinlock server 100 using RDMA according to an embodiment of the present invention. Referring to FIGS. 2 to 7, the procedure in which the distributed spinlock client 210 accesses the DSLock table stored in the distributed spinlock server 100 using RDMA may be performed as follows.

Based on the remote_CAS (resource_id, cmp, new), an operation of accessing the DSLock table using RDMA may be initiated. 'wr' may be set by generating a work request (wr) to be sent to a queue pair at step S310. A wr operation may be set to ATOMIC_CMP_SWP at step S320. The remote address of the work request (wr) may be set to the address of an entry indicated by resource_id in the DSLock table of the distributed spinlock server at step S330. The value to be compared with wr may be set to the value of 'cmp.next' at step S340. The value to be allocated to wr may be set to the value of 'new.next' at step S350. The work request (wr) may be transmitted to the queue pair at step S360. The state of wr may be checked in the completion queue of the queue pair at step S370.

Whether the wr operation has succeeded may be determined at step S380. If it is determined that the wr operation has succeeded, TRUE may be returned at step S390. In contrast, if it is determined that the wr operation has not succeeded, FALSE may be returned at step S395. In this way, the operation of accessing the DSLock table using RDMA may be terminated.

Figure 8:
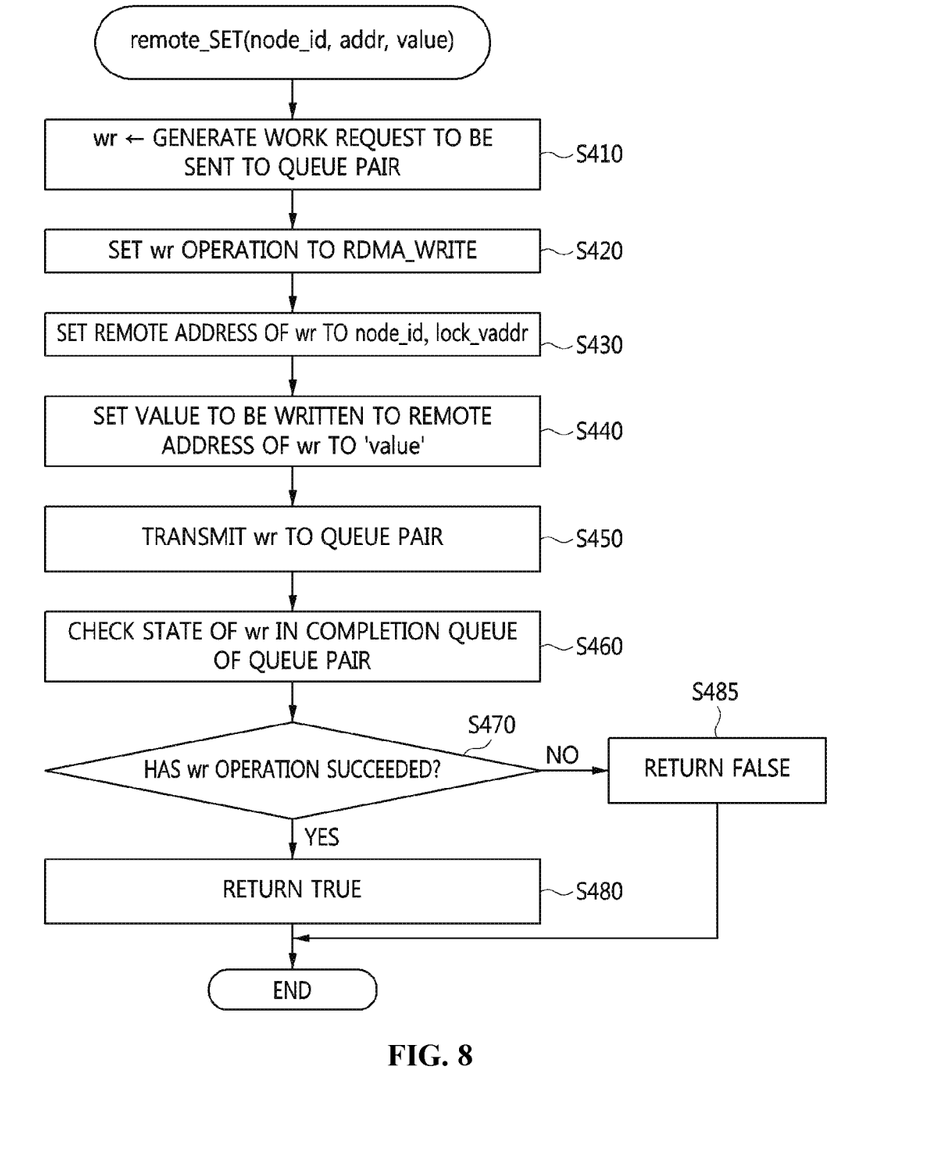
FIG. 8 is a flowchart exemplarily illustrating a procedure in which a distributed spinlock client accesses a DSLock_node table, stored in an additional distributed spinlock client, using RDMA according to an embodiment of the present invention.

FIG. 8 is a flowchart exemplarily illustrating a procedure in which a distributed spinlock client 210 accesses a DSLock_node table stored in an additional distributed spinlock client 220 using RDMA according to an embodiment of the present invention. Referring to FIGS. 2 to 8, the procedure in which the distributed spinlock client 210 accesses the DSLock_node table stored in the additional distributed spinlock client 220 using RDMA may be performed as follows.

The operation of accessing the DSLock_node table using RDMA may be initiated based on remote_SET (node_id, addr, value). A work request (wr) may be set by generating a work request to be sent to a queue pair at step S410. A wr operation may be set to RDMA_WRITE at step S420. The remote address of wr may be set to 'node_id, lock_vaddr' at step S430. The value to be written to the remote address of wr may be set to 'value' at step S440. The work request (wr) may be transmitted to the queue pair at step S450. The state of wr may be checked in the completion queue of the queue pair at step S460.

Whether the wr operation has succeeded may be determined at step S470. If it is determined that the wr operation has succeeded, TRUE may be returned at step S480. In contrast, if it is determined that the wr operation has not succeeded, FALSE may be returned at step S485. In this way, the operation of accessing the DSLock_node table using RDMA may be terminated.

Figure 9A:
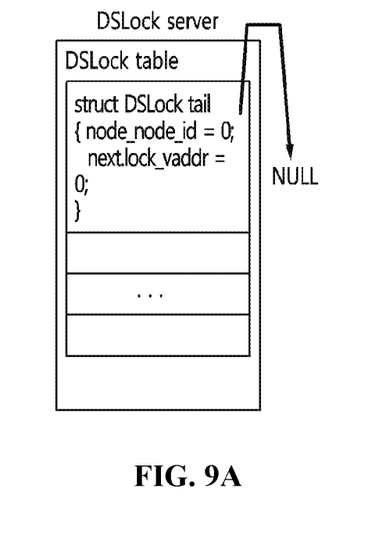
FIGS. 9A and 9B are diagrams exemplarily illustrating the results of acquiring a lock by a distributed spinlock client when lock contention for a specific DSLock table is not present in the initial state of a distributed system according to an embodiment of the present invention.
Figure 9B:
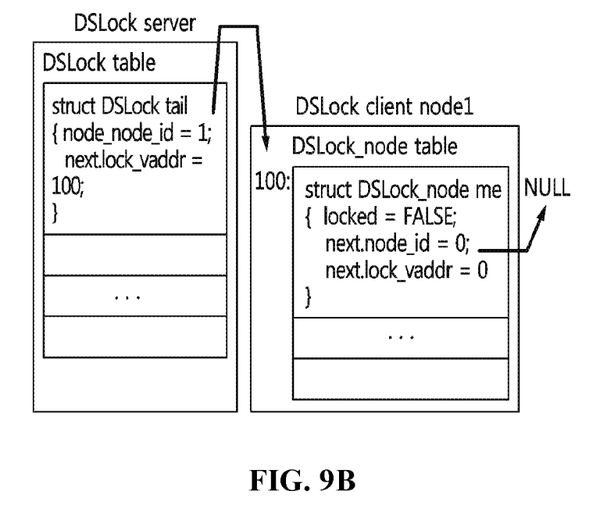

FIGS. 9A and 9B are diagrams exemplarily illustrating the results of acquiring a lock by a distributed spinlock client (node1) when lock contention for a specific DSLock table is not present in the initial state of a distributed system 10 according to an embodiment of the present invention. FIG. 9A illustrates the initial state, and FIG. 9B illustrates a data structure after the distributed spinlock client (node1) has acquired a lock.

Figure 10:
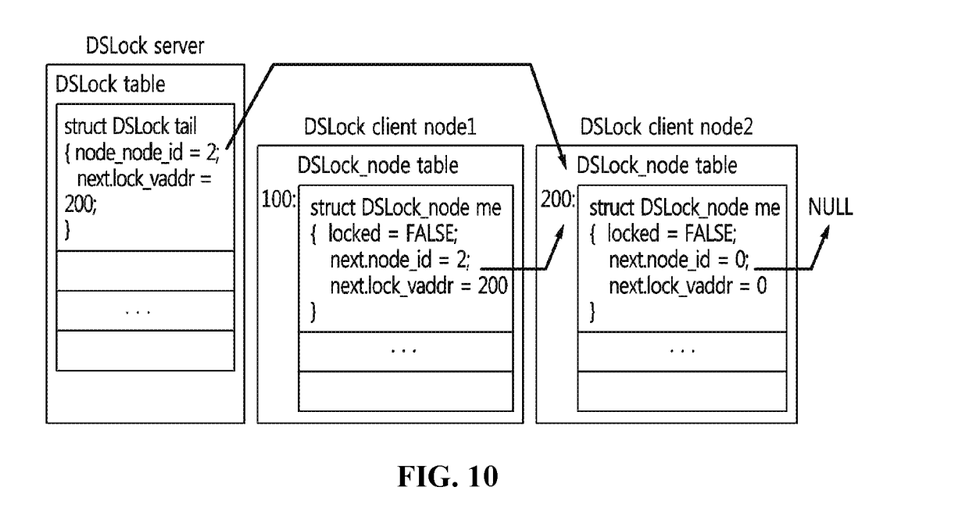
FIG. 10 is a diagram exemplarily illustrating the state of a data structure after a second distributed spinlock client has attempted to acquire a lock in the state in which a first distributed spinlock client acquires a lock when there is lock contention between the clients of a distributed system according to an embodiment of the present invention.

FIG. 10 is a diagram exemplarily illustrating the state of a data structure after a second distributed spinlock client (node 2) has attempted to acquire a lock in the state in which a first distributed spinlock client (node1) has acquired a lock when there is lock contention between the clients of a distributed system 10 according to an embodiment of the present invention.

Depending on the lock acquisition procedure, the second distributed spinlock client (node2) may register the entry of the DSLock_node table corresponding to address 200 in the DSLock table of the distributed spinlock server 100. Multiple distributed spinlock clients may simultaneously attempt to register the corresponding entry in the same entry of the DSLock table of the distributed spinlock server 100. Therefore, the DSLock table of the distributed spinlock server 100 may perform synchronization using a remote Compare-and-Swap (CAS) operation.

In an embodiment, when the distributed spinlock client attempts to register an already known entry value (tail) of the DSLock table, if the entry value (tail) of the DSLock table is identical to the attempted value (i.e., if the entry value indicates the first distributed spinlock client (node1)), the remote CAS operation may store the lock entry address of the second distributed spinlock client (node2) in the distributed spinlock server 100.

In contrast, when the entry value (tail) of the DSLock table is different from the attempted value, the remote CAS operation may read again the entry value (tail) of the DSLock table of the distributed spinlock server 100, and then again perform synchronization.

Figure 11:
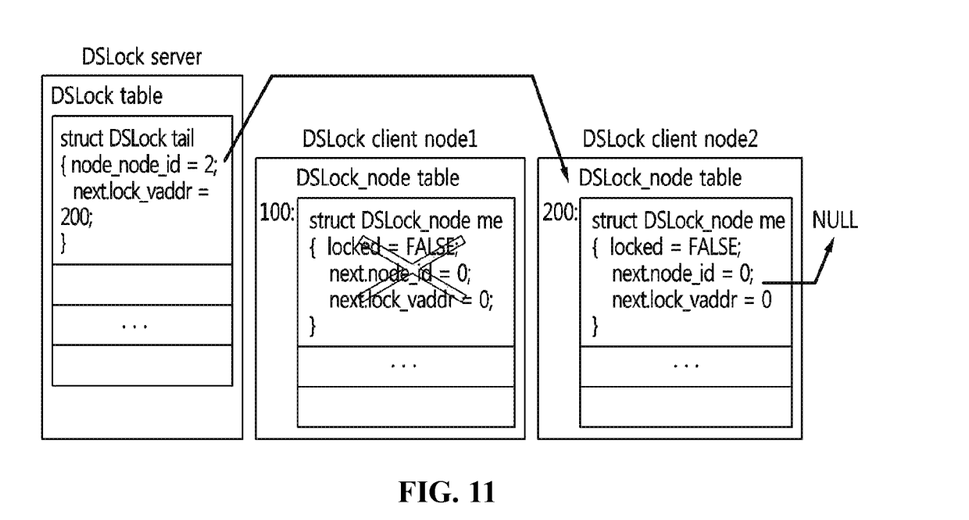
FIG. 11 is a diagram exemplarily illustrating the state of a data structure after the first distributed spinlock client has released a lock in the state of FIG. 10.

FIG. 11 is a diagram exemplarily illustrating the state of a data structure after the first distributed spinlock client (node1) has released a lock in the state of FIG. 10.

Figure 12:
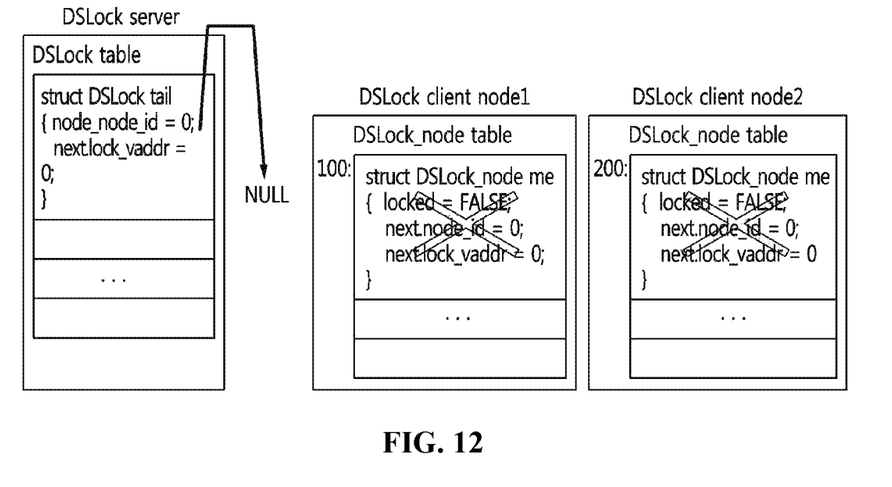
FIG. 12 is a diagram exemplarily illustrating the state of a data structure after the second distributed spinlock client has released a lock in the state of FIG. 11.

FIG. 12 is a diagram exemplarily illustrating the state of a data structure after the second distributed spinlock client (node2) has released a lock in the state of FIG. 11. Since there is no contention for the corresponding lock after the lock is released, the corresponding entry of the DSLock table of the distributed spinlock server 100 may have a NULL value.

With the development of the latest network technology, the speed of access to a shared resource, especially remote shared memory, is not greatly different from the speed of access to local memory. In this situation, it is very inefficient to use a DLM as a technique for synchronization of the shared resource. A new distributed lock technique that takes into consideration a short shared resource access time is required. The distributed system according to the embodiment of the present invention may minimize bottlenecks on a server which manages a lock, and may allow the process of a client which requests a lock to be busy waiting (i.e., in a busy-wait state), thus greatly improving the performance of a low-latency and high-bandwidth network-based distributed system.

Figure 13:
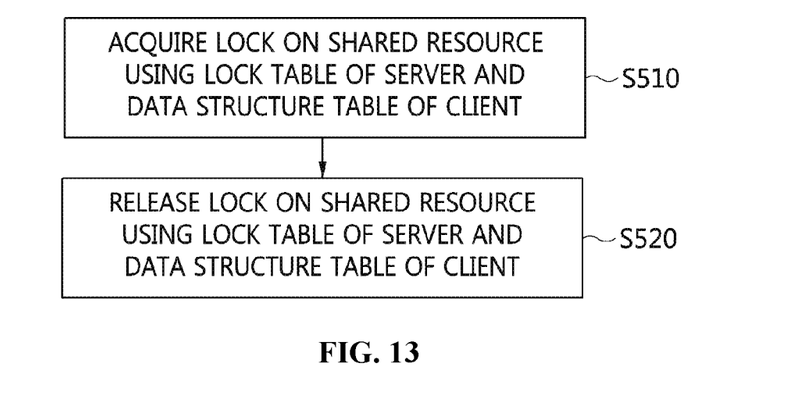
FIG. 13 is a flowchart exemplarily illustrating a method in which a distributed system manages shared resources according to an embodiment of the present invention.

FIG. 13 is a flowchart exemplarily illustrating a method in which a distributed system 10 manages shared resources according to an embodiment of the present invention. Referring to FIGS. 2 to 13, the method in which the distributed system 10 manages shared resources may be performed as follows.

An arbitrary distributed spinlock client (e.g., 210) may acquire a lock on a specific shared resource using the lock (DSLock) table of a distributed spinlock server 100 and the data structure (DSLock_node) table of the distributed spinlock client at step S510. Further, the distributed spinlock client 210 may release a lock on the specific shared resource using the lock (DSLock) table of the distributed spinlock server 100 and the data structure (DSLock_node) table of the distributed spinlock client at step S520.

The above-described embodiments may be implemented using hardware components, software components, and/or combinations of hardware components and software components. For example, the apparatus (device), method, and components described above in the embodiments may be implemented using one or more general-purpose computers or special-purpose computers, as in the case of a processor, a controller, an Arithmetic Logic Unit (ALU), a digital signal processor, a microcomputer, a Field-Programmable Gate Array (FPGA), a Programmable Logic Unit (PLU), a microprocessor, or any other device capable of executing and responding to instructions.

The client according to an embodiment of the present invention may include at least one processor; and memory which stores at least one instruction executed by the at least one processor, wherein the at least one instruction is executed by the at least one processor so that a lock on a shared resource is acquired using a first table of a server and a second table of a client; and the lock on the shared resource is released by the client using the first table and the second table.

A processing device may execute an operating system (OS) and at least one software application running on the OS. Further, the processing device may access, store, handle, process and generate data in response to execution of the software. For convenience of understanding, there is the case where a single processing device is described as being used, but those skilled in the art to which the corresponding technical fields pertain will understand that the processing device may include multiple processing elements and/or multiple types of processing elements. For example, the processing device may include multiple processors or a single processor and a single controller. Furthermore, the processing device may include an additional processing configuration such as one including parallel processors.

The method according to the embodiment may be implemented in program instructions that can be executed through various types of computer means, and may be recorded in a computer-readable storage medium. The computer-readable storage medium may include a program instruction, a data file, a data structure, etc. alone or in combination. The program instruction recorded in the medium may be designed and configured especially for the embodiments, or may be known to and used by those skilled in computer software fields. Examples of the computer-readable storage medium may include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operations of the present invention, and vice versa.

The present invention may distribute a lock data structure to a server and clients, and may then manage the lock data structure. The server may store a client lock location on which a lock has been most recently requested, and the client may store the current lock state with the client lock location on which a subsequent lock is to be acquired. By means of cooperation between the server and a client and between a certain client and an additional client, synchronization based on lock acquisition and release may be performed.

The distributed system and the method for operating the distributed system according to an embodiment of the present invention may minimize bottlenecks on a server which manages a lock, and allow the process of a client which requests a lock to be busy waiting, thus greatly improving the performance of a low-latency and high-bandwidth network-based distributed system.

Meanwhile, the descriptions of the present invention merely provide detailed embodiments for practicing the invention. The present invention may include not only means that are detailed and actually usable, but also the technical spirit, which is an abstract and conceptual idea that may be available as technology in the future.

What is claimed is:

1. A method for operating a distributed system including a server and multiple clients, the method comprising:
   acquiring, by a first client of the multiple clients, a lock on a distributed shared resource according to a lock request, using a first table of the server and a second table of the first client; and
   releasing, by the first client, the lock on the distributed shared resource using the first table and the second table,
   wherein the first table is a lock table including a client identifier of the first client and a virtual address of an entry in the second table of the first client when the first client acquires the lock on the distributed shared resource, and the second table is a data structure table that includes information indicating a lock state for the distributed shared resource.

2. The method of claim 1, wherein:
   the first table further includes information about distributed shared resources.

3. The method of claim 1, wherein each of the first and second table further includes a client identifier of a second client of the multiple clients and a virtual address of an entry in a data structure table of the second client when the second client attempts to acquire a lock in a state in which the first client has acquired the lock on the distributed shared resource.

4. The method of claim 1, wherein a number of entries in the first table equals a number of distributed shared resources to be managed.

5. The method of claim 1, wherein the server allocates a memory space for the first table and registers the allocated memory space as a remote direct memory access (RDMA) region.

6. The method of claim 5, wherein, when the allocated memory space is registered as the RDMA region, the server distributes a memory region key corresponding to the allocated memory space to the multiple clients.

7. The method of claim 2, wherein acquiring the lock comprises:
   setting a node corresponding to the first client to the entry of the second table for which the lock is to be represented;
   reading an entry corresponding to identification information of the distributed shared resource from the first table using an address of the server and the identification information of the distributed shared resource; and
   setting the entry of the second table to a value indicating the lock state using a remote compare-and-swap operation.

8. The method of claim 1, wherein releasing the lock comprises:
   setting the entry of the second table for which the lock is to be released to a node corresponding to the first client; and
   setting the entry of the second table to a value indicating a lock release using a remote compare-and-swap operation.

9. A distributed system, comprising:
   a server for managing a first table having a lock table pertaining to a distributed shared resource; and
   multiple clients, each of which is configured to manage a second table included therein, the second table having a data structure table,
   wherein a first client of the multiple clients acquires or releases a lock on the distributed shared resource according to a lock request using the first table and a second table in the first client, and
   wherein a process of the client that requests the lock is busy waiting,
   wherein the first table includes a client identifier of the first client and a virtual address of an entry in the second table of the first client when the first client acquires the lock on the distributed shared resource, and the second table includes information indicating a lock state for the distributed shared resource.

10. The distributed system of claim 9, wherein the first client accesses the first table of the server and second tables of remaining clients using remote direct memory access (RDMA).

11. The distributed system of claim 9, wherein, when the first client acquires Hall the lock in a state in which lock contention is not present, an entry value of the first table of the server is a NULL value, and entry values of second tables of remaining clients other than the first client are NULL values.

12. The distributed system of claim 9, wherein, when a second client of the multiple clients attempts to acquire a lock in a state in which the first client has acquired the lock, an entry value of a second table of the second client is registered in the first table of the server using a remote compare-and-swap (CAS) operation.

13. The distributed system of claim 9, wherein, when lock contention is not present between the multiple clients, a corresponding entry value of the first table of the server becomes a NULL value after the lock is released.

* * * * *